United States Patent
Koppens et al.

(10) Patent No.: US 11,860,502 B2
(45) Date of Patent: Jan. 2, 2024

(54) ELECTRO-OPTICAL MODULATOR AND A METHOD FOR OBTAINING AN ELECTRO-OPTICAL MODULATOR

(71) Applicants: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

(72) Inventors: Frank Koppens, Castelldefels (ES); Bernat Terrés, Castelldefels (ES); Hitesh Agarwal, Castelldefels (ES)

(73) Assignee: FUNDACIÓ INSTITUT DE CIÈNCIES FOTÒNIQUES, Castelldefels (ES)

( * ) Notice: Subject to any disclaimer, the term of this patent is extended or adjusted under 35 U.S.C. 154(b) by 11 days.

(21) Appl. No.: 17/113,749

(22) Filed: Dec. 7, 2020

(65) Prior Publication Data

US 2021/0173281 A1    Jun. 10, 2021

(30) Foreign Application Priority Data

Dec. 5, 2019    (EP) .................................... 19383089

(51) Int. Cl.
*G02F 1/225*    (2006.01)
*G02F 1/21*    (2006.01)

(52) U.S. Cl.
CPC ............ *G02F 1/2257* (2013.01); *G02F 1/212* (2021.01); *G02F 2202/42* (2013.01)

(58) Field of Classification Search
CPC ........ G02F 1/212; G02F 1/2257; G02F 1/035; G02F 1/0316; G02F 1/011; G02F 1/155;

(Continued)

(56) References Cited

U.S. PATENT DOCUMENTS 9,927,637 B2 *    3/2018    Ogawa .................. G02F 1/2257

FOREIGN PATENT DOCUMENTS

CN    105 700 203    6/2016
CN    106 526 904 A    3/2017

(Continued)

OTHER PUBLICATIONS

Agarwal et al., "Waveguide-integrated modulators and photodetectors based on high mobility hBN-graphene-hBN heterostructures," Graphene2018, Jun. 26-29, 2018, Dresden, Germany.

(Continued)

*Primary Examiner* — Thomas A Hollweg
*Assistant Examiner* — Mary A El-Shammaa
(74) *Attorney, Agent, or Firm* — Jenkins, Taylor & Hunt P.A.

(57) ABSTRACT

Provided is an electro-optical modulator, particularly a double layer graphene modulator having an optimized arrangement to provide both a large optical bandwidth and a high optical transmission for light travelling through an optical waveguide of the modulator, wherein at least one of a top and a bottom graphene sheets extends along a X-direction:
 above part of the width of the optical waveguide, wherein that part ranges from 50% to 100% of the width of the optical waveguide; or
 completely above the whole width of the optical waveguide, and beyond through a respective further projecting portion with a length, along the X direction, of up to 25% of the optical waveguide width.
Provided is also a method for obtaining the electro-optical modulator of the invention.

22 Claims, 12 Drawing Sheets

(58) Field of Classification Search
CPC ...... G02F 1/025; G02F 1/0018; G02F 1/0102; G02F 2202/42; G02F 2202/10
See application file for complete search history.

(56) References Cited

FOREIGN PATENT DOCUMENTS

| | | |
|---|---|---|
| CN | 106 980 189 | 7/2017 |
| CN | 107 037 613 | 8/2017 |
| CN | 105 068 279 | 2/2018 |
| CN | 107 153 280 | 5/2019 |
| EP | 2 584 397 | 4/2013 |
| WO | WO 2012/145605 | 10/2012 |

OTHER PUBLICATIONS

Extended European Search Report corresponding to European Patent Application No. 19383089.0 dated Jun. 16, 2020.
Shu et al. (2019) Graphene-based silicon modulators. Frontiers of Information Technology & Electronic Engineering, Zhejiang University Press, Heidelberg. 20(4):458-471. (May 18, 2019).

* cited by examiner

ELECTRO-OPTICAL MODULATOR AND A METHOD FOR OBTAINING AN ELECTRO-OPTICAL MODULATOR

This application is based on and claims the benefit of priority from European Patent Application No. 19383089, filed on Dec. 5, 2019, the contents of which are expressly incorporated by reference herein.

The project leading to this application has received funding from the European Union's Horizon 2020 research and innovation programme under grant agreement No 649953.

FIELD OF THE INVENTION

The present invention generally relates, in a first aspect, to an electro-optical modulator, and more particularly to a double layer graphene modulator having an optimized arrangement to provide both a large electro-optical bandwidth and enhanced optical transmission.

A second aspect of the present invention relates to a method for obtaining the electro-optical modulator of the first aspect of the invention.

BACKGROUND OF THE INVENTION

An electro-optical modulator comprising the following features is known in the art:
  a semiconductor substrate;
  at least first and second electrodes distanced from each other along an X-direction;
  an optical waveguide at least partially embedded within and/or arranged on the semiconductor substrate, an upper face of said optical waveguide being located at, below or above a location between said first and second electrodes, along said X-direction, wherein said optical waveguide longitudinally extends along at least a direction transversal (generally perpendicular) to said X-direction;
  a bottom graphene sheet arranged and extending along the X-direction over at least a portion of the upper face of the semiconductor substrate, with a first end electrically connected to said first electrode and without the bottom graphene sheet reaching the second electrode;
  a sheet of a first dielectric material extending over said bottom graphene sheet;
  a top graphene sheet arranged and extending along the X-direction over at least a portion of said sheet of a first dielectric material, with a first end electrically connected to said second electrode and without the top graphene sheet reaching the first electrode; and
  a second dielectric material, which is a two-dimensional material with at least dielectric properties different to the dielectric properties of said first dielectric material, covering upper and bottom faces of said top graphene sheet and/or an upper face or both upper and bottom faces of said bottom graphene sheet.

That known electro-optical modulator provides, in theory, good results regarding its optical transmission, which is not the case regarding its operating optical bandwidth, which is clearly improvable.

It is, therefore, necessary to provide an alternative to the state of the art which covers the gaps found therein, by providing an electro-optical modulator with an optimized arrangement for achieving a large optical bandwidth and a high optical modulation efficiency.

SUMMARY OF THE INVENTION

To that end, the present invention relates to an electro-optical modulator comprising:
  a semiconductor substrate;
  at least first and second electrodes distanced from each other along an X-direction;
  an optical waveguide at least partially embedded within and/or arranged on the semiconductor substrate, an upper face of said optical waveguide being located at, below or above a location between said first and second electrodes, along said X-direction, wherein said optical waveguide longitudinally extends along at least a direction transversal (generally perpendicular) to said X-direction;
  a bottom graphene sheet arranged and extending along the X-direction over at least a portion of the upper face of the semiconductor substrate, with a first end electrically connected to said first electrode and without the bottom graphene sheet reaching the second electrode;
  a sheet of a first dielectric material extending over said bottom graphene sheet;
  a top graphene sheet arranged and extending along the X-direction over at least a portion of said sheet of a first dielectric material, with a first end electrically connected to said second electrode and without the top graphene sheet reaching the first electrode; and
  a second dielectric material, which is a two-dimensional material with at least dielectric properties different to the dielectric properties of said first dielectric material, covering upper and bottom faces of said top graphene sheet and/or an upper face or both upper and bottom faces of said bottom graphene sheet.

In contrast to the electro-optical modulator known in the prior art, in the one of the present invention at least one of the top and bottom graphene sheets extends along the X-direction:
  above part of the width of the optical waveguide, wherein said part ranges from 50% to 100% of the width of the optical waveguide; or
  completely above the whole width of the optical waveguide, and beyond through a respective further projecting portion with a length, along the X direction, of up to 25% of the optical waveguide width.

For an embodiment, the top graphene sheet extends along the X-direction completely above the whole width of the optical waveguide, and beyond through a respective further projecting portion with a length, along the X direction, of up to 25% of the optical waveguide width.

For another embodiment, the bottom graphene sheet extends along the X-direction completely above the whole width of the optical waveguide, and beyond through a respective further projecting portion with a length, along the X direction, of up to 25% of the optical waveguide width.

For a preferred embodiment, particularly when there is only one waveguide, each of the top and bottom graphene sheets meets the above stated requirements regarding their extension along the X-direction above part of the width of the optical waveguide or completely above the whole width of the optical waveguide and beyond.

For an embodiment, at least one, or both, of the top and bottom graphene sheets extends along the X-direction from a 75% to a 100% above the optical waveguide width, or completely above the optical waveguide width and beyond through a further projecting portion with a length of up to a 25% of the optical waveguide width.

For an implementation of said embodiment, at least one of the top and bottom graphene sheets extend along the X-direction from a 95% to a 100% above the optical waveguide width, or completely above the optical waveguide width and beyond through a further projecting portion with a length of up to a 5% of the optical waveguide width.

For an embodiment, at least one of the top and bottom graphene sheets extends along the X-direction from a 50% to a 95% above the optical waveguide width.

According to a preferred embodiment, the top and bottom graphene sheets extend along the X-direction the same length.

Alternatively, the top and bottom graphene sheets have different lengths.

For an embodiment, the semiconductor substrate is covered by a thin layer called cladding, made of an oxide material, such as $SiO_2$.

For an embodiment of the electro-optical modulator of the first aspect of the present invention:
  the sheet of a first dielectric material extends along the X-direction at least within an area overlapped by both the top and the bottom graphene sheets; and
  a bottom sheet (when there is only a bottom sheet) of said second dielectric material covering the lower face of the top graphene sheet, or a top and bottom sheets (when both exist, the top and the bottom sheets) of said second dielectric material sandwiching the top graphene sheet, contact the second electrode and extend, along the X-direction, up to at least a top graphene free edge, and/or
  a top sheet (when there is only a top sheet) of the second dielectric material covering the upper face of the bottom graphene sheet or a top and a bottom sheets (when both exist, the top and the bottom sheets) of the second dielectric material sandwiching the bottom graphene sheet, contact the first electrode and extend, along the X-direction, up to at least just above (when there is only a top sheet) or just above and just below (when both exist, the top and the bottom sheets), respectively, a bottom graphene free edge.

For three different implementations of that embodiment:
  the sheet of a first dielectric material extends along the X-direction over the bottom graphene sheet and beyond, so that first and second opposite ends of the sheet of a first dielectric material respectively contact the first and the second electrode; or
  the sheet of a first dielectric material extends along the X-direction over the bottom graphene sheet up to just above a bottom graphene free edge; or
  the sheet of a first dielectric material extends along the X-direction occupying only the above mentioned area overlapped by both the top and the bottom graphene sheets, i.e. between just below the top graphene free edge and just above the bottom graphene free edge.

For different implementations (which can be combined with any of the above described three implementations) of the above mentioned embodiment, the top and bottom sheets of the second dielectric material which sandwich the top graphene sheet, contact the second electrode and extend, along the X-direction, just above and just below, respectively, the top graphene, or up to the first electrode, or up to any intermediate point between them.

Also for different implementations (which can be combined with any of the above described implementations) of the above mentioned embodiment, the top sheet of the second dielectric material covering the upper face of the bottom graphene sheet or a top and a bottom sheets of the second dielectric material sandwiching the bottom graphene sheet, contact the first electrode and extend, along the X-direction, just above and just below, respectively, the bottom graphene, or up to the second electrode, or up to any intermediate point between them.

According to an embodiment, regarding the different sheets of the second dielectric material:
  the thickness of the top sheet sandwiching, together with the bottom sheet, the top graphene sheet, ranges from 0 to 200 nm;
  the thickness of the bottom sheet sandwiching, together with the top sheet, the bottom graphene sheet, ranges from 0 nm to 10 nm; and
  the thickness of the bottom sheet sandwiching, together with the top sheet, the top graphene sheet, added to the thickness of the top sheet sandwiching, together with the bottom sheet, the bottom graphene sheet, ranges from 2 nm to 40 nm.

According to an embodiment, the total dielectric thickness, including the thickness of the sheet of a first dielectric material and the thickness of the second dielectric material, ranges from 9 nm to 30 nm.

For an embodiment, the thickness of the sheet of a first dielectric material ranges from a 10% to a 200% with respect to the thickness of the second dielectric material.

For a variant of said implementation, the thickness of the sheet of a first dielectric material is different to the thickness of the second dielectric material.

For some embodiments, the first dielectric material is at least one of the following materials, or a combination thereof: $HfO_2$, $SiO_2$, $Si_3N_4$, $Al_2O_3$, $ZrO_2$, $TiO_2$, TiN, $HfSiO_4$, $ZrSiO_4$, Calcium Copper Titanate, Barium Titanate, Strontium Titanate, Barium Strontium Titanate, Polystyrene, Polypropylene, Polyamide, Polyethylene, and Polytetrafluoroethylene.

With respect to the second dielectric material, for some embodiments is at least one of the following 2D layered materials, or a combination thereof: hBN, $MoTe_2$, $WSe_2$, $WS_2$, graphene, $MoS_2$, $MoSe_2$, $WS_2$, $WSe_2$, black phosphorus, and $SnS_2$.

For some embodiments, the electro-optical modulator of the present invention only comprises one waveguide.

However, for other embodiments, the electro-optical modulator of the present invention comprises two waveguides.

Particularly, for one of those other embodiments, the electro-optical modulator according to the first aspect of the present invention implements a Mach-Zehnder interferometer based arrangement, wherein the above mentioned optical waveguide is a first optical waveguide branch, and the modulator further comprises:
  a second optical waveguide branch distanced from the first optical waveguide branch along the X-direction and which is at least partially embedded within and/or arranged on the semiconductor substrate, wherein said second optical waveguide branch longitudinally extends along at least the direction transversal (preferably perpendicular) to the X-direction; and
  a third electrode located distanced from the second electrode along the X-direction, wherein the upper face of said second optical waveguide branch is located at, below or above a location between said second and third electrodes, along said X-direction.

Several different implementations of said embodiment for implementing a Mach-Zehnder interferometer based arrangement are possible, some of which will be described below.

Particularly, for one of said implementations, the electro-optical modulator further comprises:

a further bottom graphene sheet (this further bottom graphene sheet can the same graphene sheet as the top graphene sheet covering the first optical waveguide branch, or another graphene sheet but with electrical contact to the top graphene sheet) arranged and extending, along the X-direction, over at least a portion of the upper face of the semiconductor substrate and over at least a portion of the second optical waveguide branch;

a further sheet of the first dielectric material extending along the X-direction over the further bottom graphene sheet; and a further top graphene sheet arranged and extending along the X-direction over at least a portion of the further sheet of the first dielectric material and over at least a portion of the second optical waveguide branch; and further portions of the second dielectric material covering upper and bottom faces of the further top graphene sheet and/or an upper face or upper and bottom faces of the further bottom graphene sheet;

wherein at least one of the further top and further bottom graphene sheets extends along said X-direction:

above part of the width of the second optical waveguide branch, wherein said part ranges from 50% to 100% of the width of the second optical waveguide branch; or completely above the whole width of the second optical waveguide branch, and beyond through a respective further projecting portion with a length, along the X direction, of up to 25% of the width of the second optical waveguide branch.

For a variant of the above described implementation:

the further bottom graphene sheet is constituted by a projecting stepped-down portion of the top graphene sheet, and is arranged and extends from the first end of the top graphene sheet, along the X-direction, over said portion of the upper face of the semiconductor substrate and over at least said portion of the second optical waveguide branch, without reaching the third electrode; and the further top graphene sheet has a first end electrically connected to the third electrode and extends therefrom along the X-direction without reaching the second electrode.

For another variant of said implementation of the Mach-Zehnder interferometer based arrangement embodiment:

the further bottom graphene sheet has a first end electrically connected to the third electrode and extends therefrom along the X-direction, over at least said portion of the upper face of the semiconductor substrate and over at least said portion of the second optical waveguide branch;

the further sheet of the first dielectric material is integral with the sheet of the first dielectric material; and the further top graphene sheet (which can be integral with the top graphene sheet, or a separate sheet) has a region electrically connected to the second electrode and extends therefrom along the X-direction without reaching the third electrode.

For another variant of the implementation of the Mach-Zehnder interferometer based arrangement embodiment, the electro-optical modulator further comprises a fourth electrode located between the second and third electrodes along the X-direction, wherein the upper face of the second optical waveguide branch is located at, below or above a location between said fourth and third electrodes, along the X-direction; and wherein:

the further bottom graphene sheet has a first end electrically connected to the third electrode and extends therefrom along the X-direction, over at least said portion of the upper face of the semiconductor substrate and over at least said portion of the second optical waveguide branch, without reaching the fourth electrode or reaching the fourth electrode (in this latter case, the further bottom graphene sheet can be integral with the bottom graphene sheet or a separate sheet);

the further sheet of the first dielectric material is integral with the sheet of the first dielectric material; and the further top graphene sheet has a first end electrically connected to the fourth electrode and extends therefrom along the X-direction without reaching the third electrode.

Combinations of two or more of any of all the embodiments and implementations described in the present document are embraced by the present invention, in case those combinations are feasible and lead to a working embodiment.

For example, for the Mach-Zehnder interferometer based arrangement implementation described above and further below, any of the embodiments and implementations explained in the present document for an electro-optical modulator having only one waveguide can be applied to that Mach-Zehnder interferometer arrangement implementation, particularly any of the described combinations, materials, properties and dimensions of the different sheets of the electro-optical modulator can be applied to the different sheets arranged above and below the two waveguides of the Mach-Zehnder interferometer arrangement.

The present invention also relates, in a second aspect, to a method for obtaining an electro-optical modulator, comprising providing and arranging each of the components of the electro-optical modulator of the first aspect of the present invention according to any of its embodiments.

For a preferred embodiment, the method of the second aspect of the present invention comprising using a criterion based on requirements of target optical bandwidth and target optical transmission to be met by the electro-optical modulator, to determine the lengths to be provided to:

at least one of the top and bottom graphene sheets to respectively extend along the X-direction above the optical waveguide width, or completely above the whole width of the optical waveguide and beyond through a respective further projecting portion, and/or, at least one of the further top and further bottom graphene sheets to respectively extend along the X-direction above the width of the second optical waveguide branch, or completely above the whole width of the second optical waveguide branch and beyond through a respective further projecting portion.

Specifically, when for an application it is more desired to have a large target optical bandwidth than a high target optical transmission, the method of the second aspect of the present invention comprises, for said preferred embodiment, to determine and provide those lengths so that there is a low overlap between the top and bottom graphene sheets and/or between the further top and further bottom graphene sheets.

However, when for another application it is more desired to have a high target optical transmission than a large target optical bandwidth, the method of the second aspect of the present invention comprises, for said preferred embodiment, to determine and provide those lengths so that there is a large overlap between the top and bottom graphene sheets and/or between the further top and further bottom graphene sheets.

A third aspect of the invention refers to a Mach-Zehnder interferometer which differs from the Mach-Zehnder interferometer based arrangement described in the present document as an embodiment of the first aspect of the invention, mainly in that for this third aspect of the invention at least one of the top and bottom graphene sheets and/or at least one of the further top and further bottom graphene sheets (in case those further top and bottom graphene sheets exist) extends along the X-direction including but not limited by the above mentioned percentage ranges.

Specifically, the third aspect of the present invention relates to an electro-optical modulator, which implements a Mach-Zehnder interferometer based arrangement, comprising:
- a semiconductor substrate;
- at least first and second electrodes distanced from each other along an X-direction (and optionally a third electrode defined as that of the first aspect of the invention);
- a first optical waveguide branch embedded within and/or arranged on the semiconductor substrate, an upper face of the first optical waveguide branch being located at, below or above a location between the first and second electrodes, along said X-direction, wherein said first optical waveguide branch longitudinally extends along at least a direction transversal to the X-direction;
- a bottom graphene sheet arranged and extending along the X-direction over at least a portion of the upper face of the semiconductor substrate, with a first end electrically connected to the first electrode and without the bottom graphene sheet reaching the second electrode;
- a sheet of a first dielectric material extending over the bottom graphene sheet;
- a top graphene sheet arranged and extending along said X-direction over at least a portion of said sheet of a first dielectric material, with a first end electrically connected to the second electrode and without the top graphene sheet reaching the first electrode;
- a second dielectric material, which is a two-dimensional material with at least dielectric properties different to the dielectric properties of the first dielectric material, covering upper and bottom faces of the top graphene sheet and/or an upper face or both upper and bottom faces of the bottom graphene sheet; and
- a second optical waveguide branch distanced from the first optical waveguide branch along the X-direction and embedded within and/or arranged on the semiconductor substrate, wherein said second optical waveguide branch longitudinally extends along at least the direction transversal to the X-direction.

For some embodiments of the third aspect of the present invention, at least one of the top and bottom graphene sheets and/or at least one of the further top and further bottom graphene sheets extends along the X-direction:
- above part of the width of the respective (first or second) optical waveguide branch, wherein said part ranges from 1% to nearly 100% of the width of the respective (first or second) optical waveguide branch; or
- above the 100% of the width of the respective (first or second) optical waveguide branch; or
- completely above the whole width of the respective (first or second) optical waveguide branch, and beyond through a respective further projecting portion with a length, along the X direction, of up to 100% (or even more) of the width of the respective (first or second) optical waveguide branch.

BRIEF DESCRIPTION OF THE FIGURES

In the following some preferred embodiments of the invention will be described with reference to the enclosed figures. They are provided only for illustration purposes without however limiting the scope of the invention.

DESCRIPTION OF THE PREFERRED EMBODIMENTS

In the present section some working embodiments of the electro-optical modulator of the first aspect of the present invention will be described with reference to the Figures.

Figure 1:
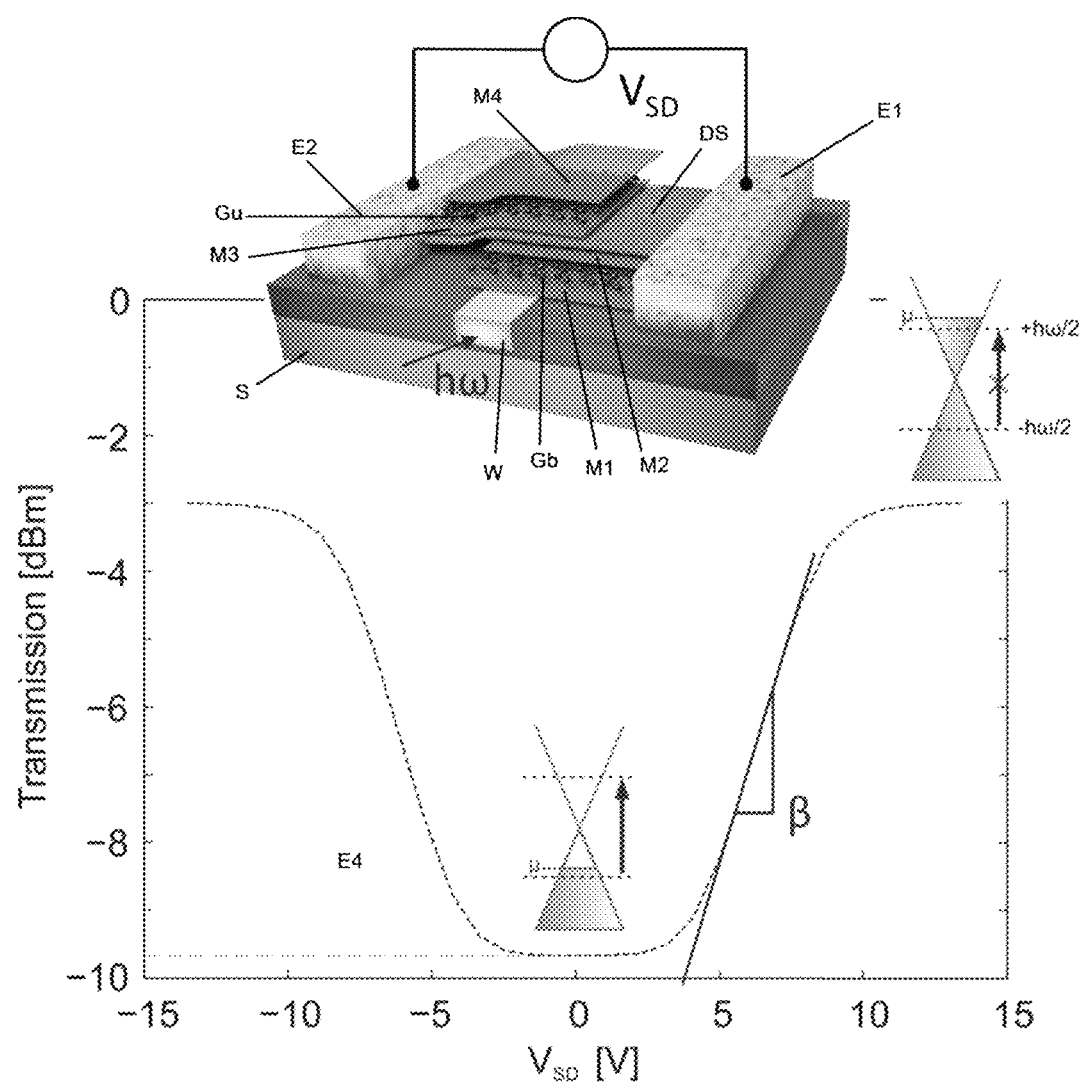
FIG. 1 schematically shows, by means of a perspective view, the electro-optical modulator of the first aspect of the present invention, for an embodiment for which it comprises only one waveguide, together with a diagram showing the optical transmission obtained versus the voltage ($V_{SD}$) applied between the first and second electrodes (in this case, source and drain electrodes), where β represents the modulator efficiency and ħω the incident light.
Figure 2:
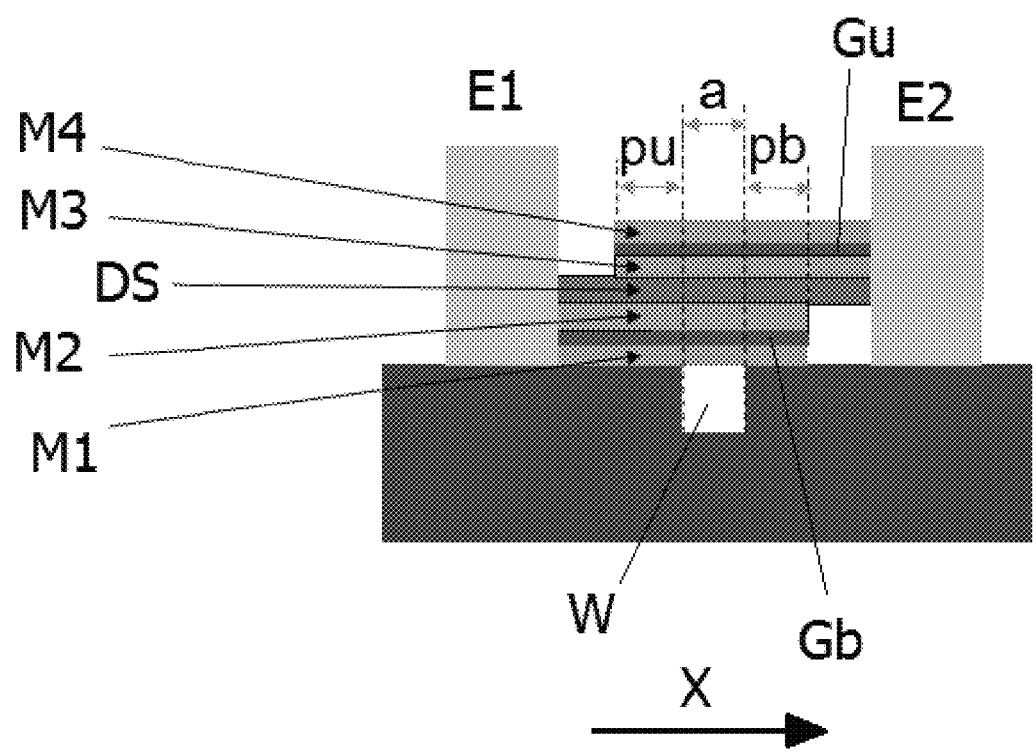
FIG. 2 schematically shows, by means of a side cross-view, the electro-optical modulator of the first aspect of the present invention, for a similar embodiment to that of FIG. 1.

Specifically, in FIGS. 1 and 2 embodiments for which the modulator has only one waveguide are disclosed, while in FIGS. 10A to 10E an embodiment for which the modulator has two waveguides is disclosed, particularly to implement different Mach-Zehnder interferometer based arrangements.

As shown in FIGS. 1 and 2, for the embodiment there illustrated, the electro-optical modulator comprises:
- a semiconductor substrate S, which is usually covered by a thin layer (usually of about 20 nm-thin), called cladding (not shown), made of an oxide material, such as $SiO_2$;
- first E1 and second electrodes E2 distanced from each other along an X-direction (see FIG. 2), and subjected to a drain-source voltage as shown in FIG. 1;
- an optical waveguide W embedded within the semiconductor substrate S with an upper face flush (although if not flush, the modulator shall also properly operate) with an upper face of the semiconductor substrate S, wherein, for the illustrated embodiment, the upper face of the optical waveguide W is located just below a location between the first E1 and second E2 electrodes, along the X-direction, wherein the optical waveguide W longitudinally extends along a direction transversal (preferably perpendicular) to the X-direction;
- a bottom graphene sheet Gb arranged and extending along the X-direction over a portion of the upper face of the semiconductor substrate S, with a first end electrically connected to the first electrode E1 and without the bottom graphene sheet Gb reaching the second electrode E2;
- a sheet DS of a first dielectric material extending over the bottom graphene sheet Gb contacting both the first E1 and the second E2 electrodes;
- a top graphene sheet Gu arranged and extending along the X-direction over a portion of the sheet DS of a first dielectric material, with a first end electrically connected to the second electrode E2 and without the top graphene sheet Gu reaching the first electrode E1; and
- a second dielectric material, with at least dielectric properties different to the dielectric properties of said first dielectric material, covering upper and bottom faces of the top graphene sheet Gu and/or an upper face or both upper and bottom faces of the bottom graphene sheet Gb.

For the illustrated embodiment, each of the top Gu and bottom Gb graphene sheets extends along the X-direction completely above the whole width of the optical waveguide W, and beyond through a respective further projecting portion, identified with the referrals pu and pb, respectively.

Each of those projecting portions pu, pb has a length, along the X direction, of up to 25% of the optical waveguide W width, identified with the referral "a". In FIG. 2, those projecting portions pu, pb seem to be longer, but that's just a schematic representation which cannot be used to extract a teaching concerning a dimension from a measurement therein. Indeed, projecting portions pu and pb have a length of up to 25% the width "a".

Alternatively, for non-illustrated embodiments, each of the top Gu and bottom Gb graphene sheets extends along the X-direction above only part of the width of the optical waveguide W, particularly above a part which ranges from 50% to 100% of the width "a" of the optical waveguide W.

Figure 3:
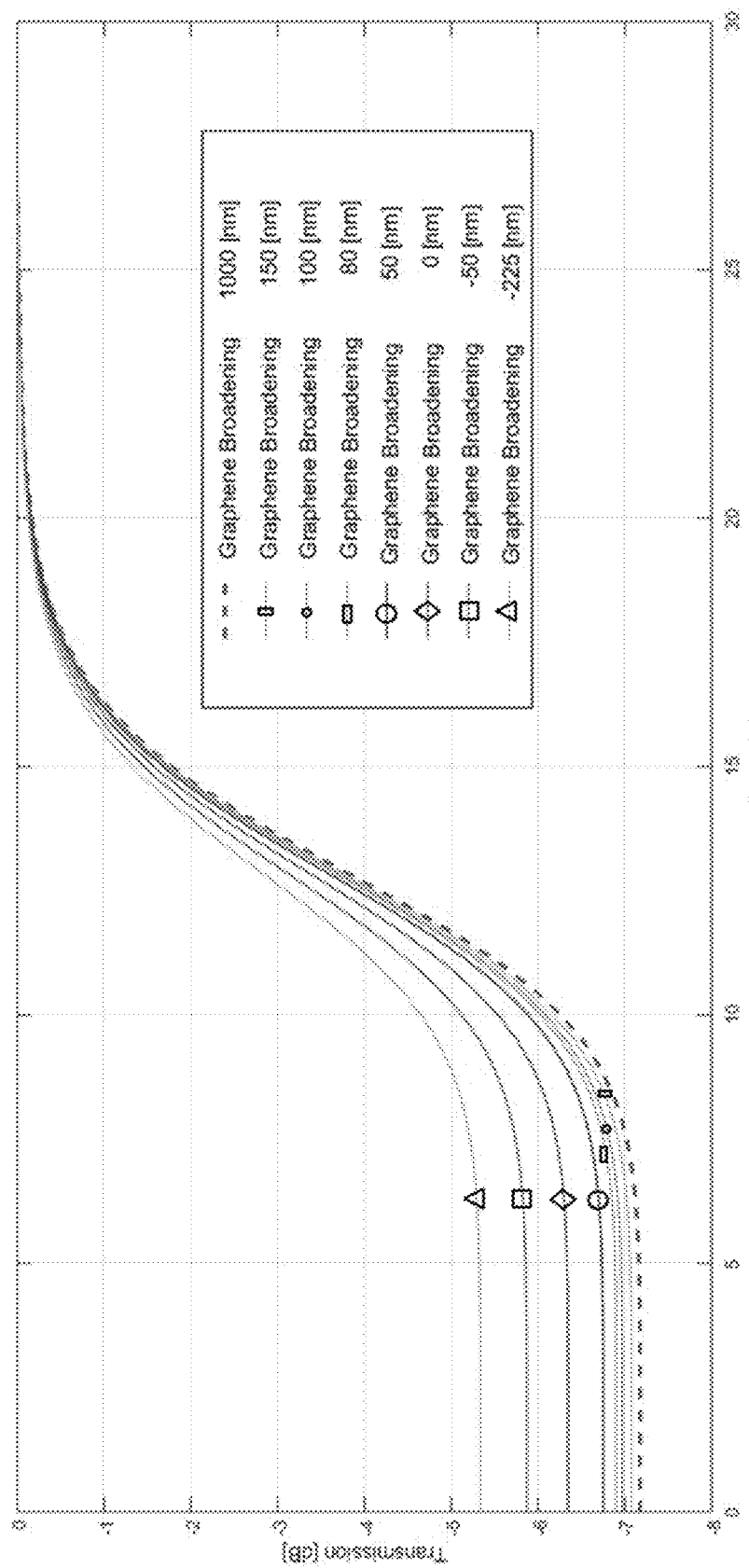
FIG. 3 shows a diagram of optical transmission versus voltage, referring to the electro-optical modulator of FIGS. 1 and 2 (where voltage is applied between the first and second electrodes, i.e. $V_{SD}$), but for different "graphene broadenings" (these terms will be described below).
Figure 4:
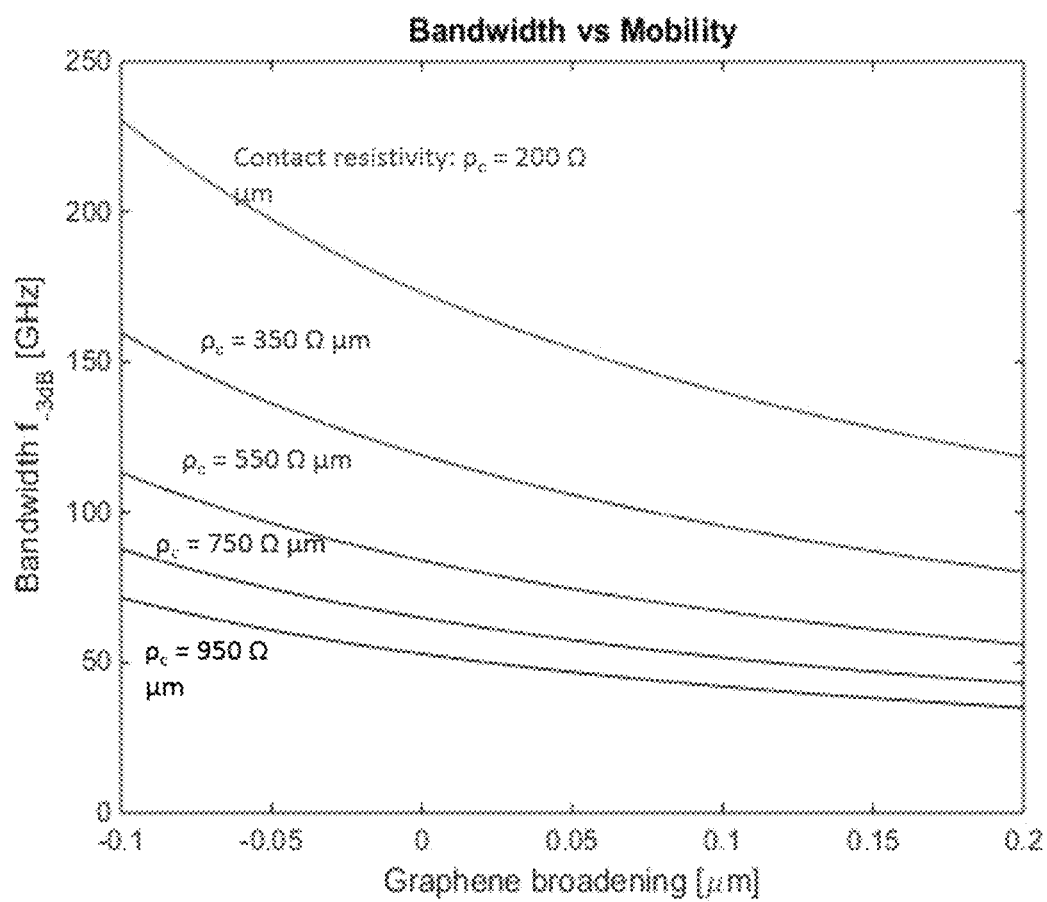
FIG. 4 shows a diagram of bandwidth versus "graphene broadening", also referring to the electro-optical modulator of FIGS. 1 and 2, for different contact resistivities.

In the present document, and particularly in the diagrams of FIGS. 3 and 4, the terms "graphene broadening" has been used to refer to the above described extension along the X-direction of the top Gu and bottom Gb graphene sheets, although in this case in absolute terms (i.e. not by means of percentages), for a width "a" for the optical waveguide W of 1 µm.

Particularly, positive values for the "graphene broadening" correspond to values of the above mentioned length of each of the projecting portions pu and pb. A waveform with a "graphene broadening" of 1000 nm (i.e. for a projecting portion with a length of 100% the width "a") is shown which is not part of the present invention, but depicted only for comparison purposes with the rest of waveforms.

The "graphene broadening" negative values refer to the above described embodiment for which each of the top Gu and bottom Gb graphene sheets extends along the X-direction above only part ranging from 50% to 100% of the width a of the optical waveguide W. Particularly, each negative value correspond to a length value, measured along the X-direction, of the distance existing between the free edge of the corresponding graphene sheet (top Gu or bottom Gb) and the edge of the waveguide W towards which the graphene sheet is extending but does not arrive to. In other words, for a width "a" of 1 µm, a "graphene broadening" of −225 nm corresponds with a part of a 77.5% of the width "a" along which the corresponding graphene sheet extend along the X-direction.

By comparing the results of the diagrams of FIGS. 3 and 4, one can see how slightly varying the "graphene broadening" has a great impact in the increase of the operating optical bandwidth while the optical transmission is only slightly reduced.

The present inventors have discovered that this is due to the fact that the region where the top Gu and bottom Gb graphene sheets overlap has a capacitance C that is directly proportional to its dimensions. The bandwidth of the modulator is defined as $BW=1/2\pi RC$. The Smaller the Overlap Between the Top Gu and Bottom Gb Graphene Sheets, the lower the C, thus increasing the bandwidth (this is directly seen in FIG. 4). From the other side, a lower C, i.e. a lower overlapped region, will have a worst transmission (as seen FIG. 3).

The diagrams of FIGS. 3 and 4, and also those of FIGS. 5, 6, 7 and 8, have been obtained from numerical simulations for an electro-optical modulator for which the first dielectric material is $HfO_2$ and the second electro-optical material is hBN. However, similar results can be obtained for other types of dielectric materials, such as for those cited in a previous section of this document.

For the embodiment illustrated in FIGS. 1 and 2:
- top M4 and bottom M3 sheets of the second dielectric material sandwich the top graphene sheet Gu, contact the second electrode E2 and extend, along the X-direction, up to at least just above and just below, respectively, a top graphene Gu free edge, and
- top M2 and a bottom M1 sheets of the second dielectric material sandwiching the bottom graphene sheet Gb, contact the first electrode E1 and extend, along the X-direction, up to just above and just below, respectively, a bottom graphene Gb free edge.

Figure 5:
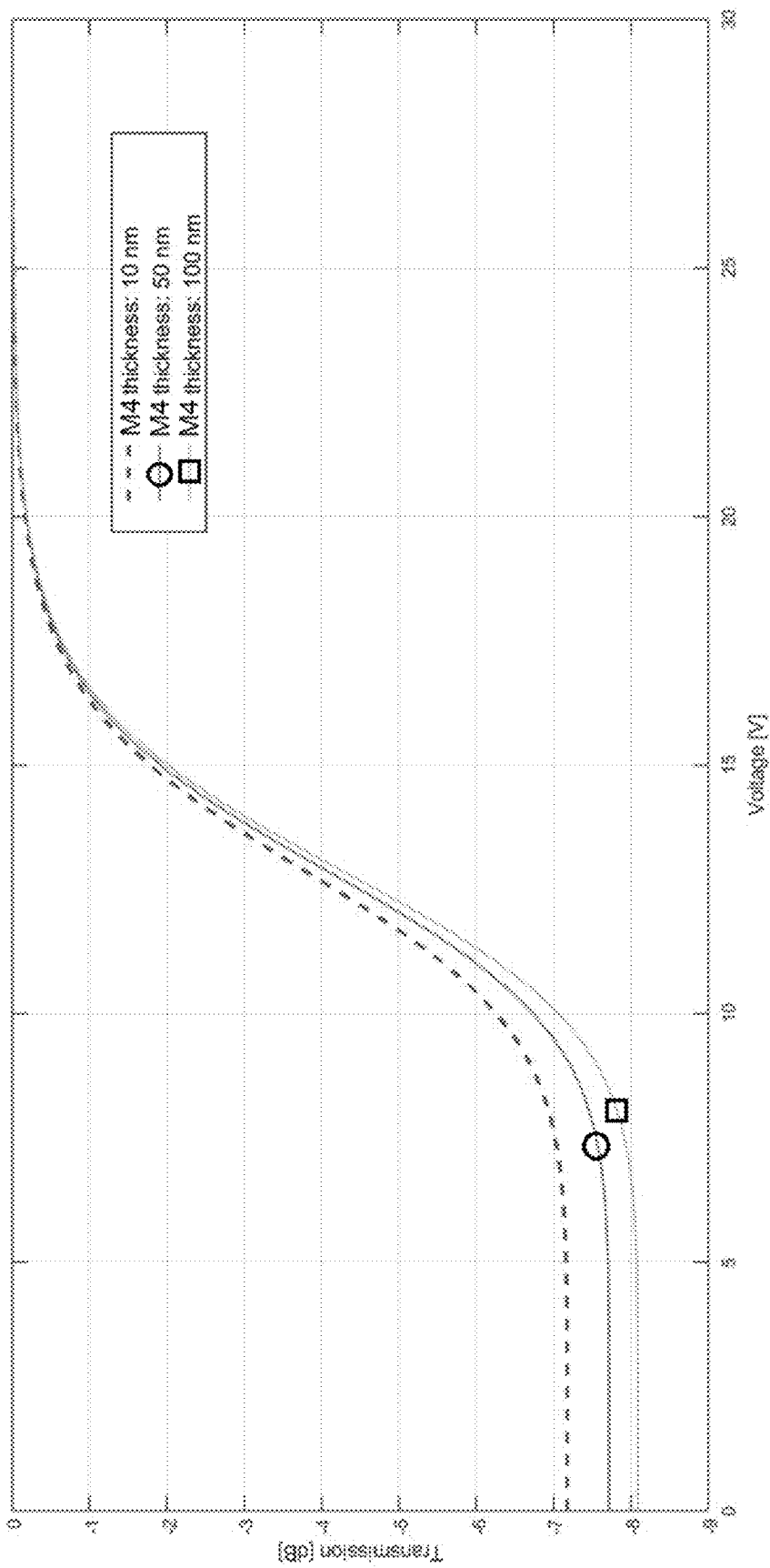
FIG. 5 shows a diagram of optical transmission versus voltage, also referring to the electro-optical modulator of FIGS. 1 and 2 (where voltage is applied between the first and second electrodes, i.e. $V_{SD}$), for different thicknesses of the top sheet (M4) of a second dielectric material.
Figure 6:
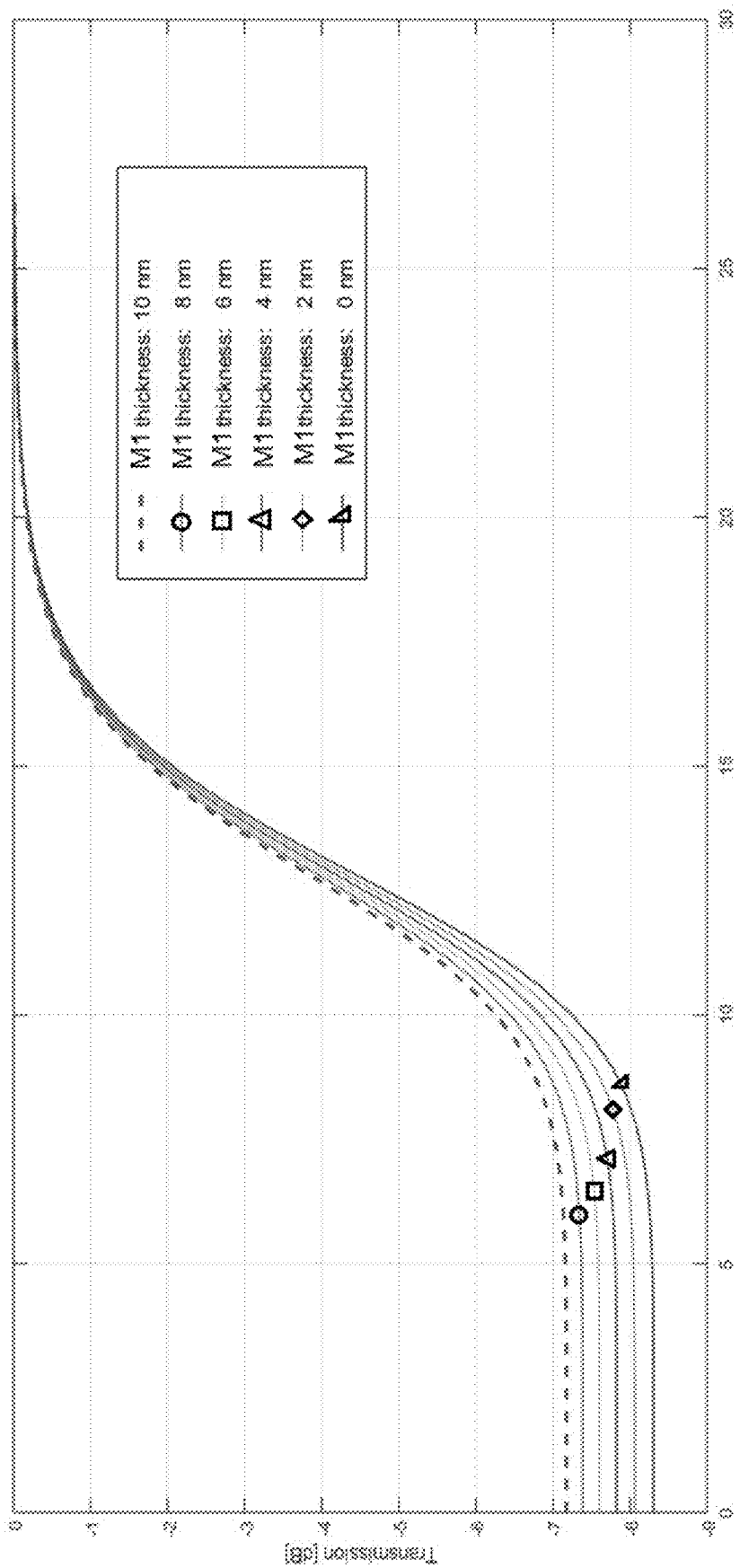
FIG. 6 also shows a diagram of optical transmission versus voltage, also referring to the electro-optical modulator of FIGS. 1 and 2 (where voltage is applied between the first and second electrodes, i.e. $V_{SD}$), for different thicknesses of the bottom sheet (M1) of a second dielectric material, including a case for a zero-thickness waveform, i.e. a case for the electro-optical modulator shown in FIGS. 1 and 2 but modified so that it does not include the bottom sheet (M1).

The diagrams of FIGS. 5 and 6 respectively show the effect of the top sheet M4 thickness and of the bottom sheet M1 thickness (including a zero-thickness M1 sheet case). The results illustrated in those diagrams show that, for the M4 top sheet, the thicker the better, and that for the M1 bottom sheet, the thinner the better.

Figure 7:
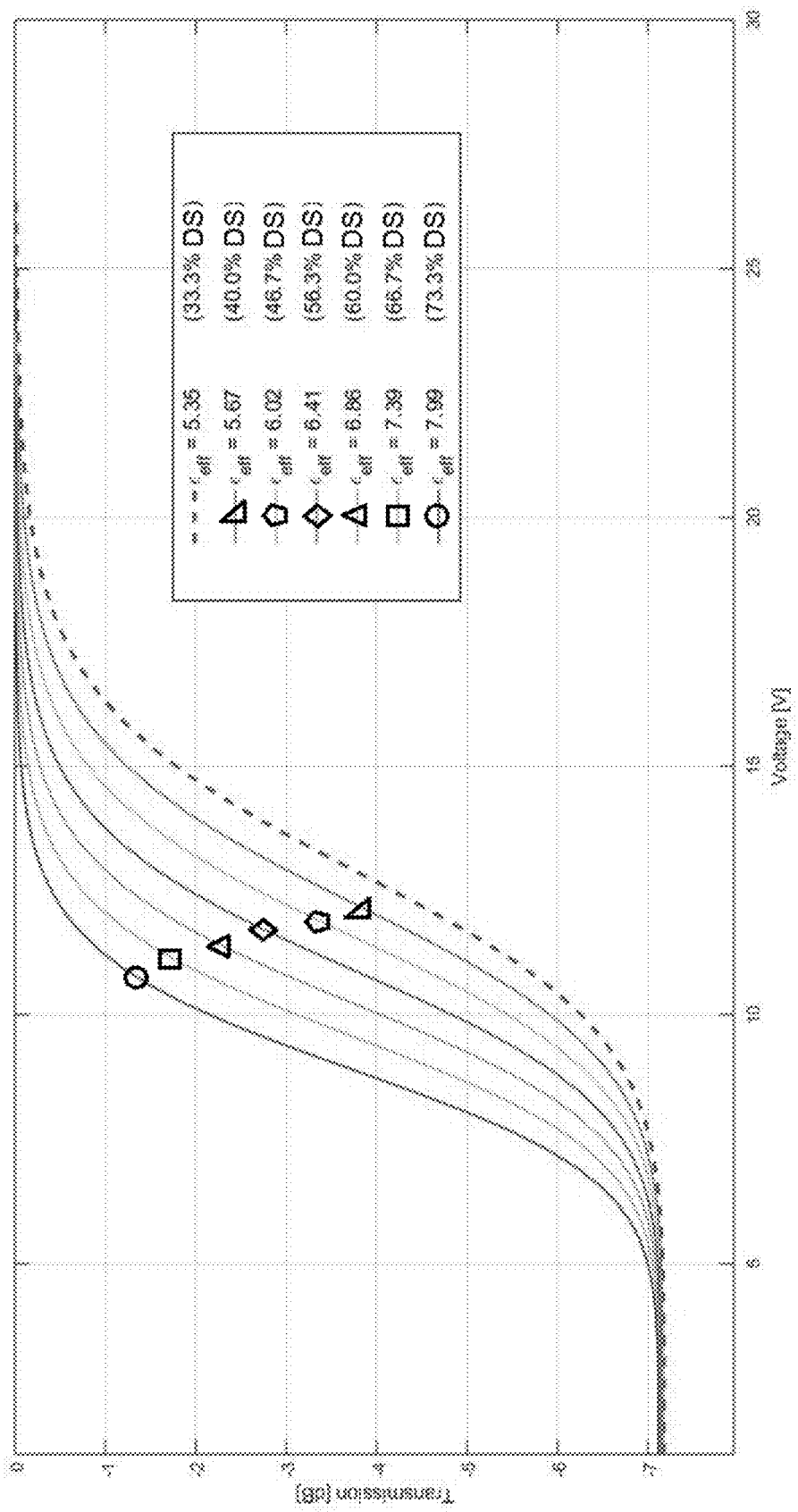
FIG. 7 shows a diagram of optical transmission versus voltage, also referring to the electro-optical modulator of FIGS. 1 and 2 (where voltage is applied between the first and second electrodes, i.e. $V_{SD}$), for different percentages of thickness of the sheet (DS) of a first dielectric material.

The influence of the thickness of the sheet DS of a first dielectric material is shown in FIG. 7, for which the first dielectric material is $HfO_2$. The total thickness of the dielectric sheets (all of them, the ones of the first dielectric material and the ones of the second dielectric material) has been kept constant, so that when the thickness of $HfO_2$ has been increased, the thickness of the M2 and/or M3 sheets has been proportionally reduced. The results show how for the DS sheet, the higher percentage the better.

Figure 8:
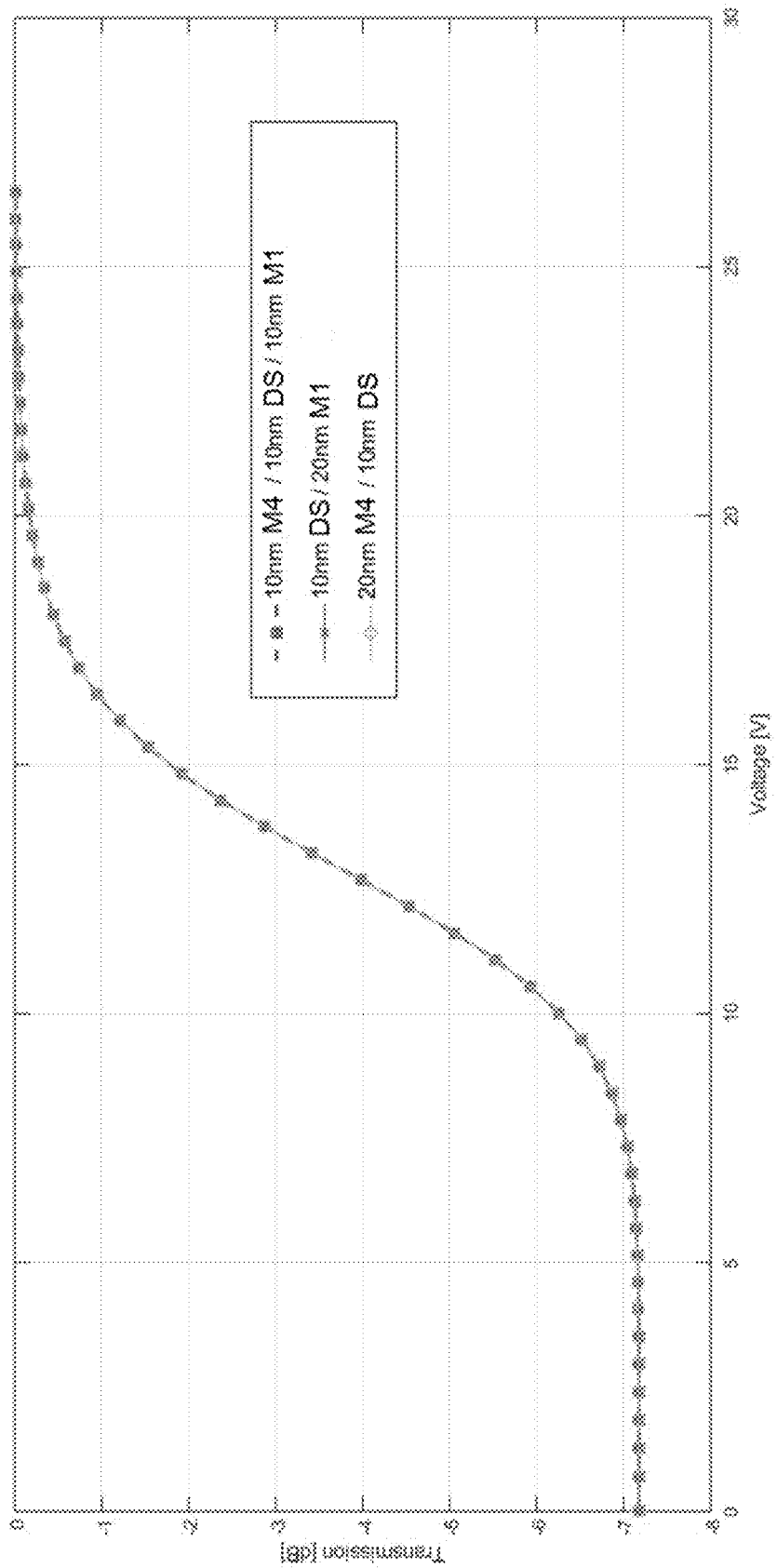
FIG. 8 shows a diagram of optical transmission versus voltage, also referring to the electro-optical modulator of FIGS. 1 and 2 (where voltage is applied between the first and second electrodes, i.e. $V_{SD}$), for different combinations of sheets of first and second dielectric materials, and respective thicknesses, for which either the top sheet (M4) and the bottom sheet (M1) of the second dielectric material are not included, i.e. cases for the electro-optical modulator shown in FIGS. 1 and 2 but modified so that it does not include one of said sheets (M4 or M1).

FIG. 8 shows how the order of the different dielectric sheets within the top and bottom graphene sheets (only M3, M2 and DS have been taken into account) has no influence in the optical transmission. This is due to the fact that, for the simulations, M1 and M2 are the same materials and what matters is their total thickness.

Figure 9:
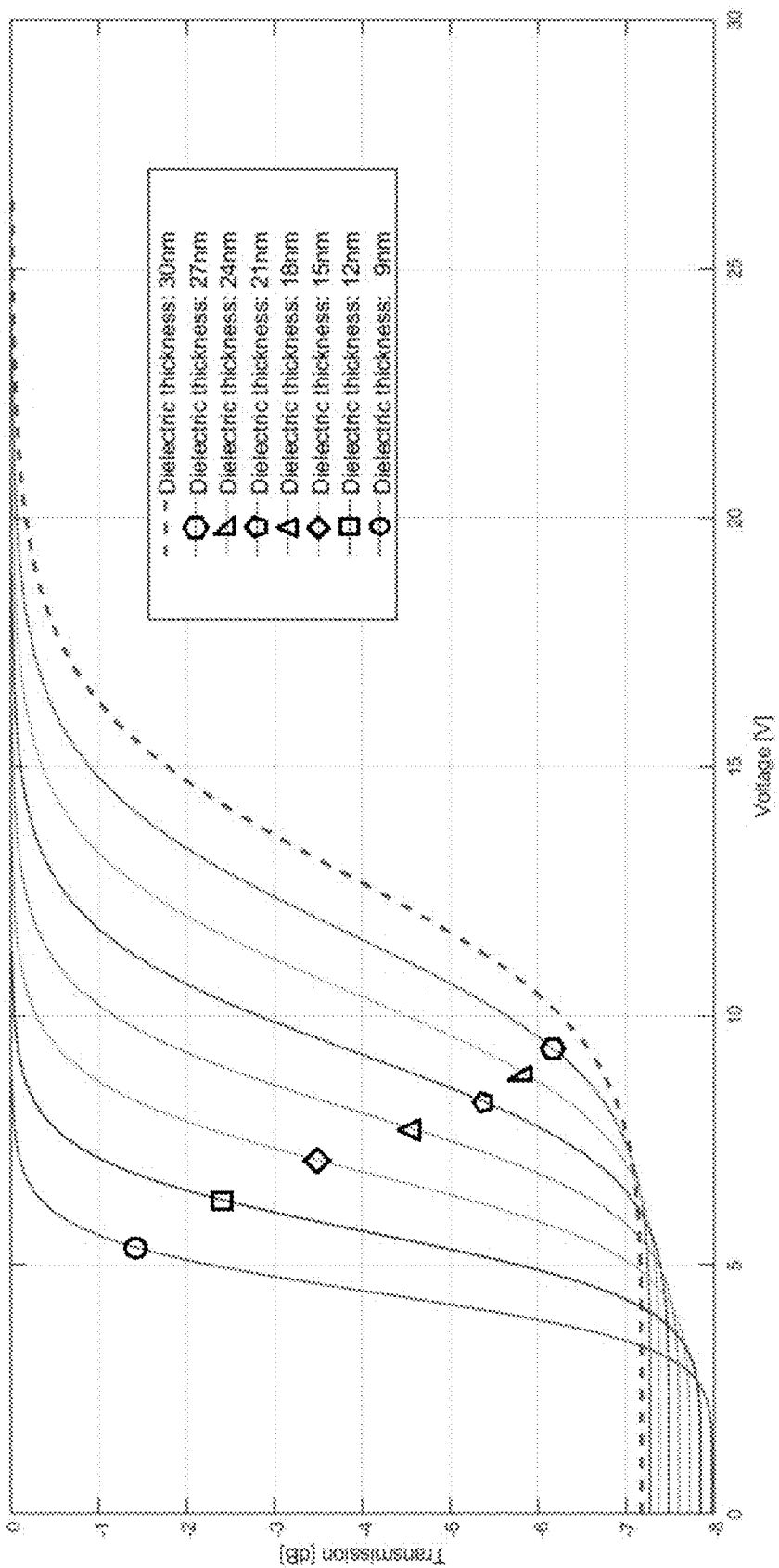
FIG. 9 shows a diagram of optical transmission versus voltage, also referring to the electro-optical modulator of FIGS. 1 and 2 (where voltage is applied between the first and second electrodes, i.e. $V_{SD}$), for different thicknesses of whole dielectric material in between the top and bottom graphene sheets, i.e. the layers M3, M2 and DS.

The influence of the thickness of dielectric material within the top and bottom graphene sheets (M3+M2+DS) is shown in FIG. 9, showing that the smaller the thickness the better. The relative thickness (percentage) of each dielectric sheet has been kept constant.

The influence of the thickness of the whole dielectric material (M1+M2+M3+M4+DS) is shown in FIG. 9, showing that the higher the thickness, the better. The relative thickness (percentage) of each dielectric sheet has been kept constant.

FIGS. 10A to 10E schematically show different variants and/or implementations of an embodiment for which the electro-optical modulator according to the first aspect of present invention implements a Mach-Zehnder interferometer based arrangement (the arrangements depicted in FIGS. 10A to 10E also represent embodiments of the third aspect of the present invention), wherein the optical waveguide W is a first optical waveguide branch W1, and the modulator further comprises:
- a second optical waveguide branch W2 distanced from the first optical waveguide branch W1 along the X-direction and embedded within the semiconductor substrate S, wherein the second optical waveguide branch W2 longitudinally extends along at least the direction transversal to the X-direction; and
- a third electrode E3 located distanced from the second electrode E2 along the X-direction, wherein, for the illustrated embodiment the upper face of the second optical waveguide branch W2 is located below a location between said second E2 and third electrodes E3, along the X-direction.

Figure 10A:
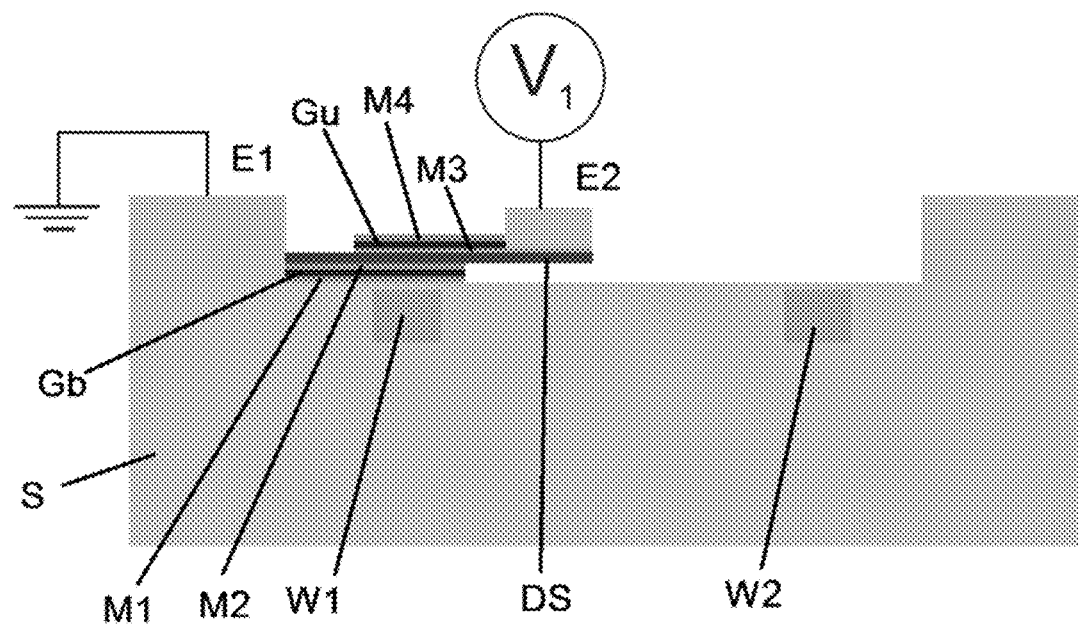
FIGS. 10A to 10E schematically show different variants and/or implementations of an embodiment for which the electro-optical modulator according to the first aspect of present invention implements a Mach-Zehnder interferometer based arrangement. The arrangements depicted in FIGS. 10A to 10E also represent embodiments of the third aspect of the present invention.

For the variant shown in FIG. 10A, the second optical waveguide branch W2 is left uncovered, just embedded within the substrate S. Therefore, in use, i.e. when a voltage V1 is applied between the first E1 and the second E2 electrodes, only the phase of the light travelling through the core of the first optical waveguide branch W1 is changed.

For the rest of variant, i.e. for those of FIGS. 10B to 10E, in use, the phase of the light travelling through the cores of both optical waveguide branches, W1 and W2, is changed, and the electro-optical modulator further comprises:
- a further bottom graphene sheet Gbf arranged and extending, along the X-direction, over at least a portion of the upper face of the semiconductor substrate S and over at least a portion of the second optical waveguide branch W2;
- a further sheet DSf of said first dielectric material extending along the X-direction over the further bottom graphene sheet Gbf;
- a further top graphene sheet Guf arranged and extending along the X-direction over at least a portion of the further sheet DSf of the first dielectric material and over at least a portion of the second optical waveguide branch W2; and
- further portions of the second dielectric material covering upper and bottom faces of said further top graphene sheet Guf and/or an upper face or upper and bottom faces of said further bottom graphene sheet Gbf.

One or both of the further top Guf and further bottom Gbf graphene sheets extends along the X-direction:
- above part of the width of the second optical waveguide branch W2, wherein said part ranges from 50% to 100% of the width of the second optical waveguide branch W2; or
- completely above the whole width of the second optical waveguide branch W2, and beyond through a respective further projecting portion with a length, along the X direction, of up to 25% of the width of the second optical waveguide branch W2.

Figure 10B:
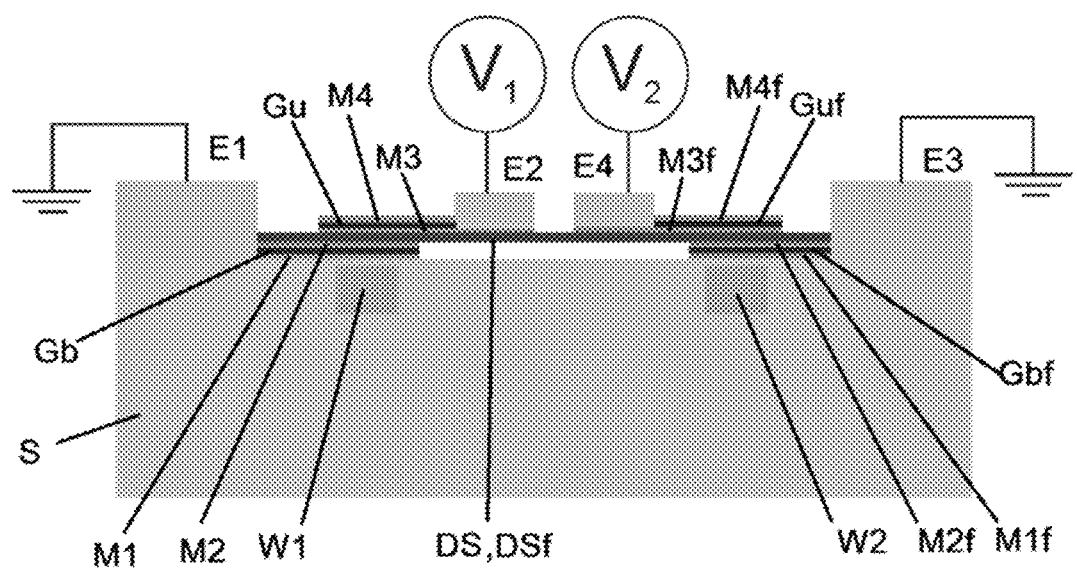
Figure 10C:
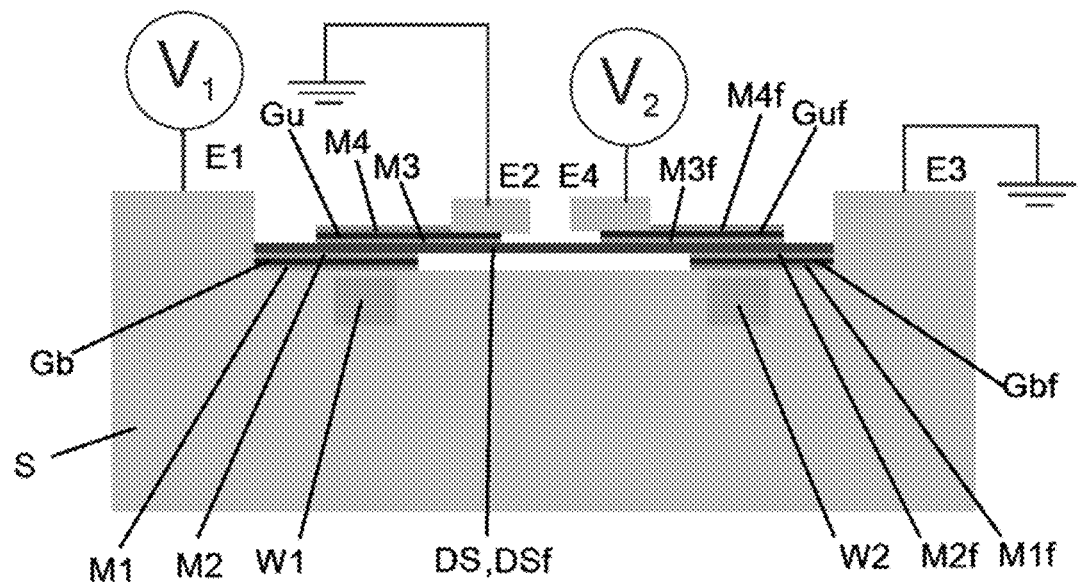

Specifically, for the variant illustrated by FIGS. 10B and 10C:
- the further bottom graphene sheet Gbf has a first end electrically connected to the third electrode E3 and extends therefrom along the X-direction, over only a portion of the upper face of the semiconductor substrate S and, in this case, above the whole width of the second optical waveguide branch W2 and beyond through a respective further projecting portion with a length, along the X direction, of up to 25% of the width of second optical waveguide branch W2, although, as stated above, it could extend above only a part ranging from 50% to 100% of that width;
- said further sheet DSf of said first dielectric material is integral with said sheet DS of said first dielectric material; and
- said further top graphene sheet Guf has a first end electrically connected to the second electrode E2 and extends therefrom along the X-direction without reaching the third electrode E3, in this case, above the whole width of the second optical waveguide branch W2 and beyond (up to 25% its width), although, as stated above, it could extend above only a part ranging from 50% to 100% of that width.

Alternatively, for a non-illustrated embodiment, each of the top Gu and bottom Gb graphene sheets extends along the X-direction above only part of the width of the second optical waveguide branch W2, particularly above a part which ranges from 50% to 100% of the width of the second optical waveguide branch W2.

The differences between the variants of FIGS. 10B and 10C are just the electrodes to which the terminals of voltage source V1 is applied, as voltage source V2 is applied to the same electrodes for both figures. For FIG. 10B, voltage V1 is applied to the second electrode E2 while the first E1 electrode is connected to ground, and for FIG. 10C the inverse connection is made.

For the variant illustrated by FIG. 10D, the electro-optical modulator further comprises a fourth electrode E4 located between the second E2 and third E3 electrodes along the X-direction, wherein the upper face of the second optical waveguide branch W2 is located below a location between the fourth E4 and third electrodes E3, along the X-direction; and wherein:
- the further bottom graphene sheet Gbf is integral with the bottom graphene sheet Gb, so that opposite ends of the resulting common graphene sheet are respectively electrically connected to the first E1 and the third E3 electrode, extending along the X-direction over the upper face of the substrate S and above the whole width of both the first W and the second W2 optical waveguide branches;

the further sheet DSf of the first dielectric material is integral with the sheet DS of the first dielectric material; and the further top graphene sheet Guf has a first end electrically connected to the fourth electrode E4 and extends therefrom along the X-direction without reaching the third electrode E3, in this case above the whole width of the second optical waveguide branch W2 and beyond (up to 25% its width), although, as stated above, it could extend above only a part ranging from 50% to 100% of that width.

Figure 10D:
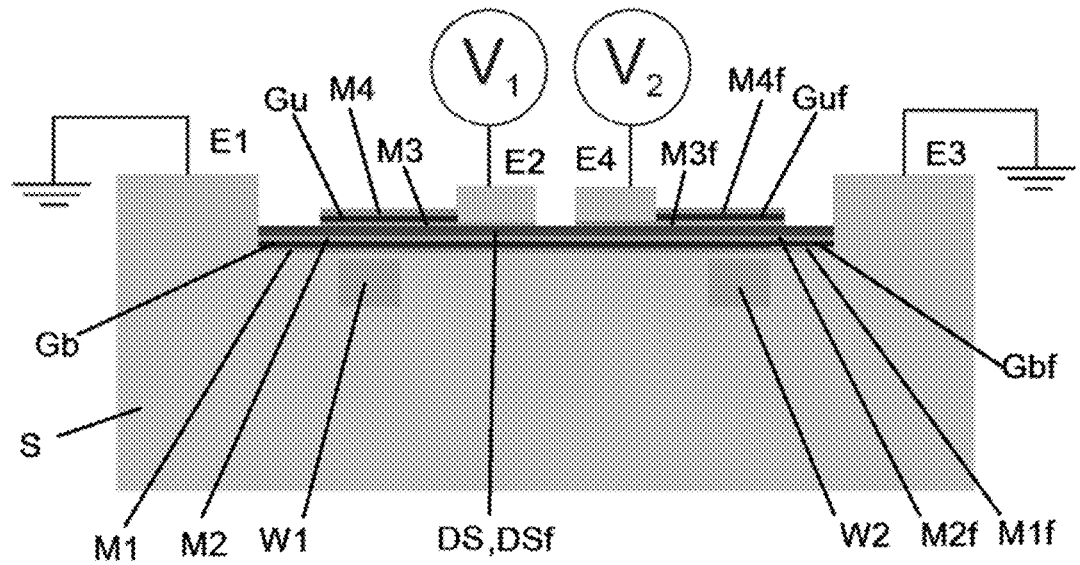

For the variant of FIG. 10D, the voltage sources V1 and V2 are connected the same as for that of FIG. 10B.

Figure 10E:
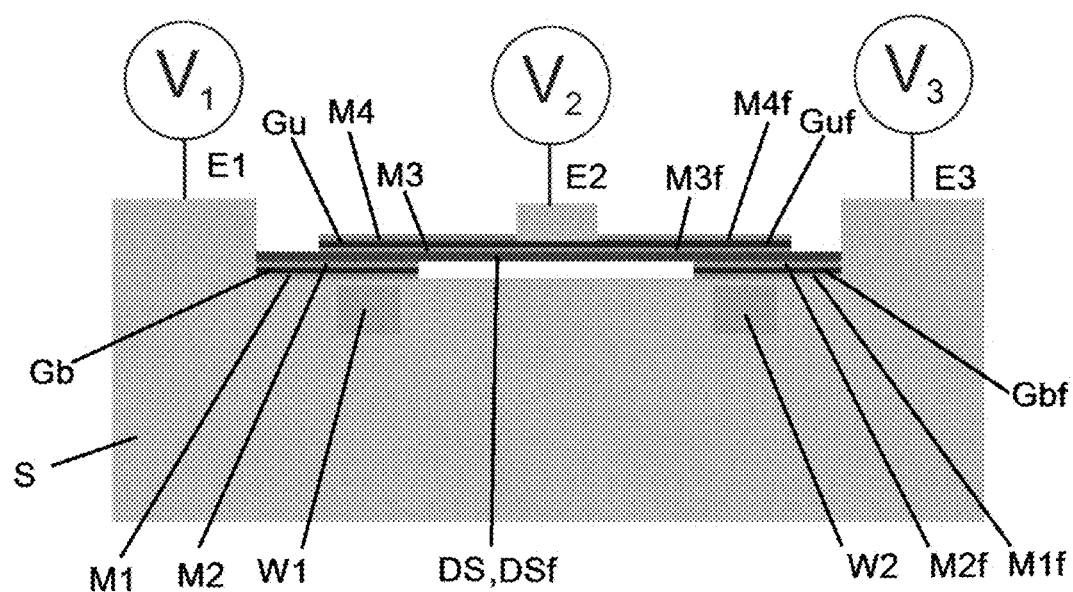

As shown in FIG. 10E, for the variant there illustrated:

the further bottom graphene sheet Gbf has a first end electrically connected to the third electrode E3 and extends therefrom along the X-direction, over a portion of the upper face of the semiconductor substrate S, and, in this case, above the whole width of the second optical waveguide branch W2 and beyond (up to 25% its width), although, as stated above, it could extend above only a part ranging from 50% to 100% of that width;

the further sheet DSf of the first dielectric material is integral with the sheet DS of the first dielectric material and the resulting common sheets extends from the first E1 to the third E3 electrodes; and the further top graphene sheet Guf is integral with the top graphene sheet Gu, so a central region of the resulting common graphene sheet is electrically connected to the second electrode E2, and both opposite ends extend, along the X-direction over the upper face of the substrate S, towards the first E1 and the third E3 electrodes, respectively, so that, in this case, each, Gu and Guf, extends above the whole width of the first W1 or second W2 optical waveguide branch and beyond (up to 25% its width), although, as stated above, it could extend above only a part ranging from 50% to 100% of that width.

For the variant of FIG. 10E, three voltages are applied, namely V1, V2 and V3, each to a respective of the first E1, second E2 and third E3 electrodes.

As state above, FIGS. 10A to 10E are schematic, which means, for example, that those elements depicted floating are not floating but really bent.

The operation of the modulators of FIGS. 10A to 10E is the already known associated to Mach-Zehnder interferometer based arrangements together with the one already explained above for the modulator of FIGS. 1 and 2, i.e. it benefits from the same effects explained above with respect to the "graphene broadening".

A person skilled in the art could introduce changes and modifications in the embodiments described without departing from the scope of the invention as it is defined in the attached claims.

What is claimed is:

1. An electro-optical modulator, comprising:
   a semiconductor substrate;
   at least first and second electrodes distanced from each other along an X-direction;
   an optical waveguide embedded within and/or arranged on said semiconductor substrate, an upper face of said optical waveguide being located at, below or above a location between said first and second electrodes, along said X-direction, wherein said optical waveguide longitudinally extends along at least a direction transversal to said X-direction;
   a bottom graphene sheet arranged and extending along said X-direction over at least a portion of the upper face of the semiconductor substrate, with a first end electrically connected to said first electrode and without the bottom graphene sheet reaching the second electrode;
   a sheet of a first dielectric material extending over said bottom graphene sheet;
   a top graphene sheet arranged and extending along said X-direction over at least a portion of said sheet of a first dielectric material, with a first end electrically connected to said second electrode and without the top graphene sheet reaching the first electrode; and
   a second dielectric material, which is a two-dimensional material with at least dielectric properties different to the dielectric properties of said first dielectric material, said second dielectric material covering:
   upper and bottom faces of said top graphene sheet and/or an upper face of said bottom graphene sheet; or
   upper and bottom faces of said top graphene sheet and/or both upper and bottom faces of said bottom graphene sheet;
   wherein at least one of said top and bottom graphene sheets extends along said X-direction:
      above part of the width of the optical waveguide, wherein said part ranges from 50% to 100% of the width of the optical waveguide; or
      completely above the whole width of the optical waveguide, and beyond through a respective further projecting portion with a length, along the X direction, of up to 25% of the optical waveguide width.

2. The electro-optical modulator according to claim 1, wherein said top graphene sheet extends along said X-direction completely above the whole width of the optical waveguide, and beyond through a respective further projecting portion with a length, along the X direction, of up to 25% of the optical waveguide width.

3. The electro-optical modulator according to claim 1, wherein said bottom graphene sheet extends along said X-direction completely above the whole width of the optical waveguide, and beyond through a respective further projecting portion with a length, along the X direction, of up to 25% of the optical waveguide width.

4. The electro-optical modulator according to claim 1, wherein each of the top and bottom graphene sheets extends along the X-direction above part of the width of the optical waveguide, wherein said part ranges from 50% to 100% of the width of the optical waveguide.

5. The electro-optical modulator according to claim 1, wherein each of the top and bottom graphene sheets extends along the X-direction completely above the whole width of the optical waveguide, and beyond through a respective further projecting portion with a length, along the X direction, of up to 25% of the optical waveguide width.

6. The electro-optical modulator according to claim 1, wherein at least one of the top and bottom graphene sheets extends along said X-direction from a 75% to a 100% above the optical waveguide width.

7. The electro-optical modulator according to claim 6, wherein at least one of the top and bottom graphene sheets extend along said X-direction from a 95% to a 100% above the optical waveguide width.

8. The electro-optical modulator according to claim 1, wherein at least one of the top and bottom graphene sheets extends along said X-direction from a 50% to a 95% above the optical waveguide width.

9. The electro-optical modulator according to claim 1, wherein at least one of the top and bottom graphene sheets extends along said X-direction completely above the optical waveguide width and beyond through a further projecting portion with a length of up to a 5% of the optical waveguide width.

10. The electro-optical modulator according to claim 1, wherein:
said sheet of a first dielectric material extends along the X-direction at least within an area overlapped by both the top and the bottom graphene sheets; and
a bottom sheet of said second dielectric material covering the lower face of the top graphene sheet or a top and bottom sheets sandwiching the top graphene sheet, contact the second electrode and extend, along the X-direction, up to at least just above and just below, respectively, a top graphene free edge, and/or
a top sheet of said second dielectric material covering the upper face of the bottom graphene sheet or a top and a bottom sheets of the second dielectric material sandwiching the bottom graphene sheet, contact the first electrode and extend, along the X-direction, up to at least just above or just above and just below, respectively, a bottom graphene free edge.

11. The electro-optical modulator according to claim 10, wherein, regarding the different sheets of the second dielectric material:
the thickness of the top sheet sandwiching, together with the bottom sheet, the top graphene sheet, ranges from 0 to 200 nm;
the thickness of the bottom sheet sandwiching, together with the top sheet, the bottom graphene sheet, ranges from 0 nm to 10 nm; and
the thickness of the bottom sheet sandwiching, together with the top sheet, the top graphene sheet, added to the thickness of the top sheet sandwiching, together with the bottom sheet, the bottom graphene sheet, ranges from 2 nm to 40 nm.

12. The electro-optical modulator according to claim 1, wherein the total dielectric thickness, including the thickness of the sheet of a first dielectric material and the thickness of the second dielectric material, ranges from 9 nm to 30 nm.

13. The electro-optical modulator according to claim 1, wherein the thickness of the sheet of a first dielectric material ranges from a 10% to a 200% with respect to the thickness of the second dielectric material.

14. The electro-optical modulator according to claim 13, wherein the thickness of the sheet of a first dielectric material is different to the thickness of the second dielectric material.

15. The electro-optical modulator according to claim 1, wherein:
said first dielectric material is at least one of the following materials, or a combination thereof: $HfO_2$, $SiO_2$, $Si_3N_4$, $Al_2O_3$, $ZrO_2$, $TiO_2$, TiN, $HfSiO_4$, $ZrSiO_4$, Calcium Copper Titanate, Barium Titanate, Strontium Titanate, Barium Strontium Titanate, Polystyrene, Polypropylene, Polyamide, Polyethylene, and Polytetrafluoroethylene; and
said second dielectric material is at least one of the following 2D layered materials, or a combination thereof: hBN, $MoTe_2$, $WSe_2$, $WS_2$, graphene, $MoS_2$, $MoSe_2$, $WS_2$, $WSe_2$, black phosphorus, and $SnS_2$.

16. The electro-optical modulator according to claim 1, which implements a Mach-Zehnder interferometer based arrangement, wherein said optical waveguide is a first optical waveguide branch, the modulator further comprising:
a second optical waveguide branch distanced from the first optical waveguide branch along the X-direction and embedded within and/or arranged on the semiconductor substrate, wherein said second optical waveguide branch longitudinally extends along at least the direction transversal to the X-direction; and
a third electrode located distanced from the second electrode along the X-direction, wherein the upper face of said second optical waveguide branch is located at, below or above a location between said second and third electrodes, along said X-direction.

17. The electro-optical modulator according to claim 16, further comprising:
a further bottom graphene sheet arranged and extending, along the X-direction, over at least a portion of the upper face of the semiconductor substrate and over at least a portion of the second optical waveguide branch;
a further sheet of said first dielectric material extending along the X-direction over the further bottom graphene sheet);
a further top graphene sheet arranged and extending along said X-direction over at least a portion of the further sheet of said first dielectric material and over at least a portion of the second optical waveguide branch; and
further portions of the second dielectric material covering upper and bottom faces of said further top graphene sheet and/or an upper face or upper and bottom faces of said further bottom graphene sheet;
wherein at least one of said further top and further bottom graphene sheets extends along said X-direction:
above part of the width of the second optical waveguide branch, wherein said part ranges from 50% to 100% of the width of the second optical waveguide branch; or
completely above the whole width of the second optical waveguide branch, and beyond through a respective further projecting portion with a length, along the X direction, of up to 25% of the width of the second optical waveguide branch.

18. The electro-optical modulator according to claim 17, wherein:
said further bottom graphene sheet has a first end electrically connected to the third electrode and extends therefrom along the X-direction, over at least said portion of the upper face of the semiconductor substrate and over at least said portion of the second optical waveguide branch;
said further sheet of said first dielectric material is integral with said sheet of said first dielectric material; and
said further top graphene sheet has a region electrically connected to the second electrode and extends therefrom along the X-direction without reaching the third electrode.

19. The electro-optical modulator according to claim 17, further comprising a fourth electrode located between the second and third electrodes along the X-direction, wherein the upper face of the second optical waveguide branch is located at, below or above a location between said fourth and third electrodes, along the X-direction; and wherein:
said further bottom graphene sheet has a first end electrically connected to the third electrode and extends therefrom along the X-direction, over at least said portion of the upper face of the semiconductor substrate and over at least said portion of the second optical waveguide branch;

said further sheet of said first dielectric material is integral with said sheet of said first dielectric material; and said further top graphene sheet has a first end electrically connected to the fourth electrode and extends therefrom along the X-direction without reaching the third electrode.

20. A method for obtaining an electro-optical modulator, comprising providing and arranging each of the components of the electro-optical modulator according to claim 1.

21. The method according to claim 20, comprising using a criterion based on requirements of target optical bandwidth and target optical transmission to be met by the electro-optical modulator, to determine the lengths to be provided to:

at least one of the top and bottom graphene sheets to respectively extend along the X-direction above the optical waveguide width, or completely above the whole width of the optical waveguide and beyond through a respective further projecting portion, and/or, at least one of the further top and further bottom graphene sheets to respectively extend along the X-direction above the width of the second optical waveguide branch, or completely above the whole width of the second optical waveguide branch and beyond through a respective further projecting portion.

22. An electro-optical modulator, which implements a Mach-Zehnder interferometer based arrangement, comprising:

a semiconductor substrate;

at least first and second electrodes distanced from each other along an X-direction;

a first optical waveguide branch embedded within and/or arranged on said semiconductor substrate, an upper face of said first optical waveguide branch being located at, below or above a location between said first and second electrodes, along said X-direction, wherein said first optical waveguide branch longitudinally extends along at least a direction transversal to said X-direction;

a bottom graphene sheet arranged and extending along said X-direction over at least a portion of the upper face of the semiconductor substrate, with a first end electrically connected to said first electrode and without the bottom graphene sheet reaching the second electrode;

a sheet of a first dielectric material extending over said bottom graphene sheet;

a top graphene sheet arranged and extending along said X-direction over at least a portion of said sheet of a first dielectric material, with a first end electrically connected to said second electrode and without the top graphene sheet reaching the first electrode;

a second dielectric material, which is a two-dimensional material with at least dielectric properties different to the dielectric properties of said first dielectric material, said second dielectric material covering:

upper and bottom faces of said top graphene sheet and/or an upper face of said bottom graphene sheet; or upper and bottom faces of said top graphene sheet and/or both upper and bottom faces of said bottom graphene sheet; and a second optical waveguide branch distanced from the first optical waveguide branch along the X-direction and embedded within and/or arranged on the semiconductor substrate, wherein said second optical waveguide branch longitudinally extends along at least the direction transversal to the X-direction.

* * * * *